United States Patent [19]

Yoshimura

[11] Patent Number: 5,017,901
[45] Date of Patent: May 21, 1991

[54] CONTROLLER FOR A MOVABLE MEMBER

[75] Inventor: Toshio Yoshimura, Tokyo, Japan

[73] Assignee: Tanashin Denki Co., Ltd., Tokyo, Japan

[21] Appl. No.: 542,885

[22] Filed: Jun. 25, 1990

[30] Foreign Application Priority Data

Jul. 15, 1989 [KR] Rep. of Korea ............... 10415/1989

[51] Int. Cl.$^5$ ........................... H01F 7/08; H01F 7/18
[52] U.S. Cl. ..................................... 335/265; 335/242
[58] Field of Search ............... 335/265, 119, 120, 232, 335/233, 242, 259; 74/96

[56] References Cited

U.S. PATENT DOCUMENTS

| | | |
|---|---|---|
| 3,549,823 | 12/1970 | Pastor . |
| 3,602,650 | 8/1971 | Ban . |
| 3,612,542 | 10/1971 | Marcinkus . |
| 3,622,162 | 11/1971 | Ikeda . |
| 3,665,117 | 5/1972 | Starr . |
| 3,670,981 | 6/1972 | Cavella . |
| 3,695,620 | 10/1972 | Ban . |
| 3,716,241 | 2/1973 | Rayner . |
| 3,772,469 | 11/1973 | Johnson . |
| 3,911,486 | 10/1975 | Hibbard . |
| 3,972,070 | 7/1976 | Fukayama et al. .................... 360/77 |
| 4,062,248 | 12/1977 | Hattendorf . |
| 4,385,330 | 5/1983 | Serafini ............................... 360/71 |
| 4,448,364 | 5/1984 | Frystak et al. . |
| 4,513,335 | 4/1985 | van Kreuningen ................... 360/94 |
| 4,538,190 | 8/1985 | Louth . |
| 4,630,148 | 12/1986 | Deutsch et al. ....................... 360/93 |

FOREIGN PATENT DOCUMENTS 61-38111 4/1986 Japan .

Primary Examiner—Harold Broome
Attorney, Agent, or Firm—Oblon, Spivak, McClelland, Maier & Neustadt

[57] ABSTRACT

A tape recorder having a controller for a movable member is able to control the movement of the member between two states by one electromagnet. The controller includes an electromagnet having first and second attracting parts which correspond to first and second attracted parts, a driving member which is driven through a fixed motion by a driving source, a combining part for moving which is installed on said movable member so as to separate from the driving member or be maintained in the combined state with said driving member by said first attracted part, a combining part for keeping position which is installed on said movable member to maintain said movable member in the second position by combining with the second attracted part and a leaving prevention part for preventing the leaving from said driving member of said combining part for moving when said movable member is at a position from halfway between said first and second positions to its second position. A separating part which is installed on said moving member or on said combining part for moving, can pull apart said first attracted part forcibly from said first attracting part after said combining part for moving has reached said leaving prevention part by movement of said movable member from said first position toward said second position and also before said part reaches said second position.

1 Claim, 3 Drawing Sheets

CONTROLLER FOR A MOVABLE MEMBER

BACKGROUND OF THE INVENTION

1. Field of the Invention

This invention relates to a controller of a movable member which moves the member between two states using one electromagnet, for example in a tape recorder.

2. Discussion of the Background;

Conventionally, the movable member was moved from the first position to the second position by combining the movable member, which moves freely between the first and the second positions, with the driving part. Also the controller for the movable member which stays in its second position is well-known.

In this conventional controller for the movable member, an electromagnet has been used for combining the movable member and the driving member and another electromagnet used to hold the movable member in the second position. In such a two electromagnet system, an electric current switching circuit for selecting the flow into the two electromagnets was needed to control the increase of current capacity and heat generating quantity. As a result, there is a problem in trying to reduce the size and weight due to its complex constitution and the necessity of wider space for those installations.

In order to solve this problem, an electromagnet having two attracting parts was used. This electromagnet can perform both functions of combining the movable member with the driving member and holding the movable member in the second position.

However, when combining the two functions in one electromagnet, since the attracting force is weakened when the attracted part has been attracted at the same time by the two attracting parts of the electromagnet, the capacity of the electromagnet must be increased. Thus there is a problem which requires a higher electric power consumption as well as a higher price.

SUMMARY OF THE INVENTION

This invention has been accomplished by taking into consideration the problems mentioned above. It is a general object of the invention to provide an effective controller of the movable member which controls the movable member reliably by one electromagnet having a small capacity, so that an electric current switching circuit is not necessary, and the constitution is simple which allows miniaturization and a reduction in weight.

In order to achieve the object of the invention, the invention includes a controller for a movable member which is able to move freely between the first and the second positions. This is combined with a driving member, which moves from the first position to the second position, and is maintained in the second position. The controller includes an electromagnet having first and second attracting parts; first and second attracted parts corresponding to the first and second attracting parts; a driving member which moves in a fixed motion and is driven with a driving source; a combining part for moving which is installed on said movable member so as to separate from its driving member, the combining part for moving being combined state with said driving member by the first attracted part; a combining part for keeping position which is installed on said movable member, the combining part for keeping position maintaining the movable member in said second position by combining with the second attracted part; a leaving prevention part which prevent the combining part for moving from leaving the driving when the movable member is at a position from halfway between the first and second positions to the second position; and a separating part which is installed on the moving member or on the combining part for moving, which can pull apart the first attracted part forcibly from the first attracting part after the combining part for moving has reached the leaving prevention part by moving of the movable member from the first position toward the second position and also before the part reaches the second position. A separated position holding part is mounted on the movable member so as to maintain the second attracted part at the position separated from the second attracting pat where the movable member is positioned between the first position and just before the second position.

With the first attracted part being attracted the the first attracting part of the electromagnet, the combined state between the movable member in the first position and the driving member is maintained by the combining part for moving, and the movable member can move from the first position to the second position by the driving force of the driving part. And, after the combining part for moving has reached the leaving prevention part by moving the movable part toward the first and second positions and also prior to its reaching the second position, the first attracted part is forcibly separated from the first attracting part by the leaving part. Even if the first attracted part is separated for the first attracting part, the combination of the movable member and the driving member is not released through the combining part for moving because the leaving of the combining part of moving from the driving part is prevented by the leaving prevention part.

In this manner, the magnetic flux is concentrated at the second attracting part on account of the separation of the first attracted part from the first attracting part. Owing to the strong attraction of the second attracted part to the second attracting part, the movable part is kept up on the second position by the combining part for position holding.

Since the second attracted part is maintained in a separated state without being attracted to the second attracting part which the first attracted part is attracted to the first attracting part, the first attracted part is strongly attracted to the first attracting part by the concentration of the magnetic flux at the first attracting part.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
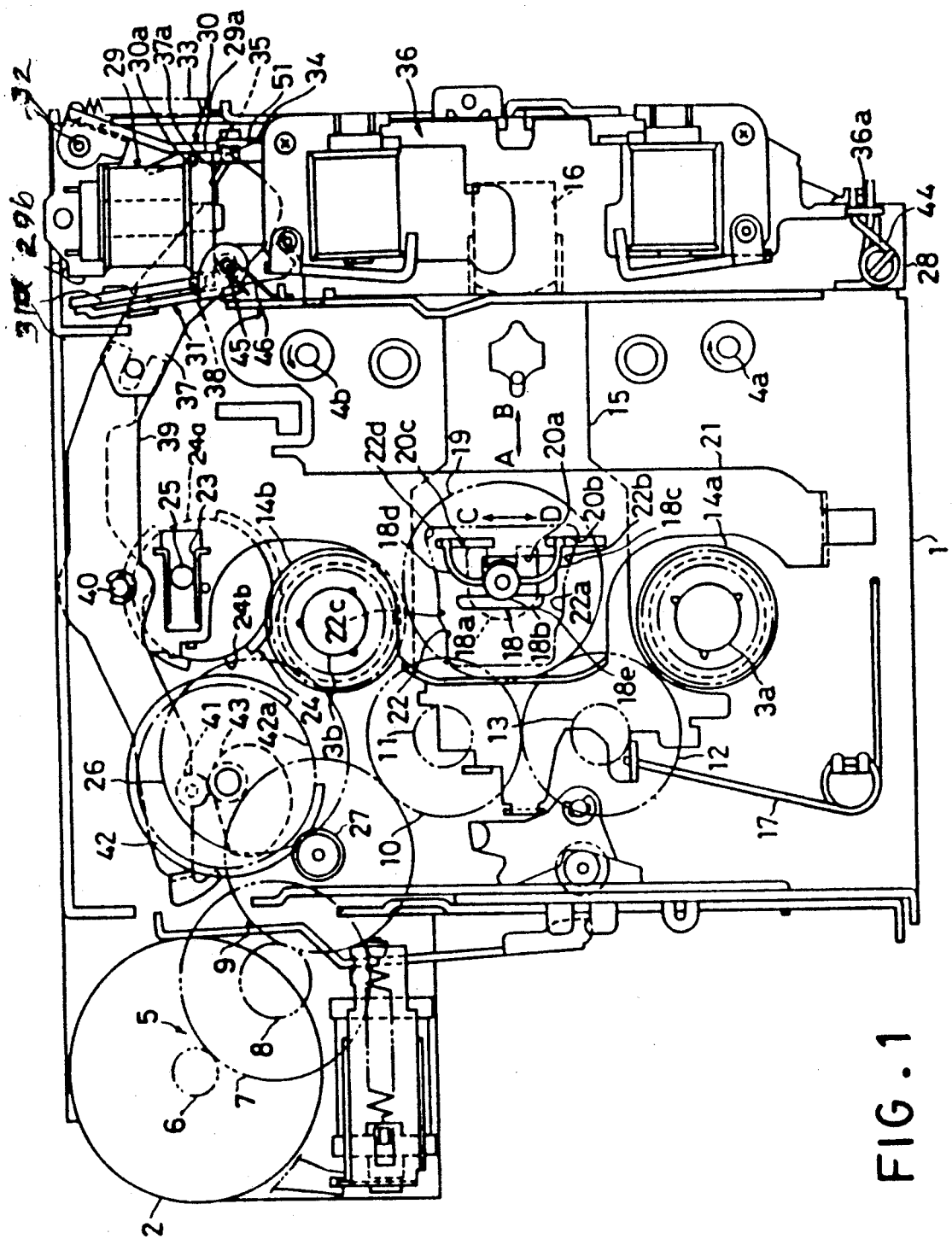
FIG. 1 is a plan view of the tape recorder incorporating the controller for the movable member according to the invention.

Various other objects, features and attendant advantages of the present invention will be more fully appreciated as the same becomes better understood from the following detailed description when considered in connection with the accompanying drawings in which like reference characters designate like or corresponding parts throughout the several views and wherein:

FIG. 1 is a plan view of the tape recorder which has incorporates the controller of the movable member of the invention, in which reference numeral 1 is the base plate.

Figure 2:
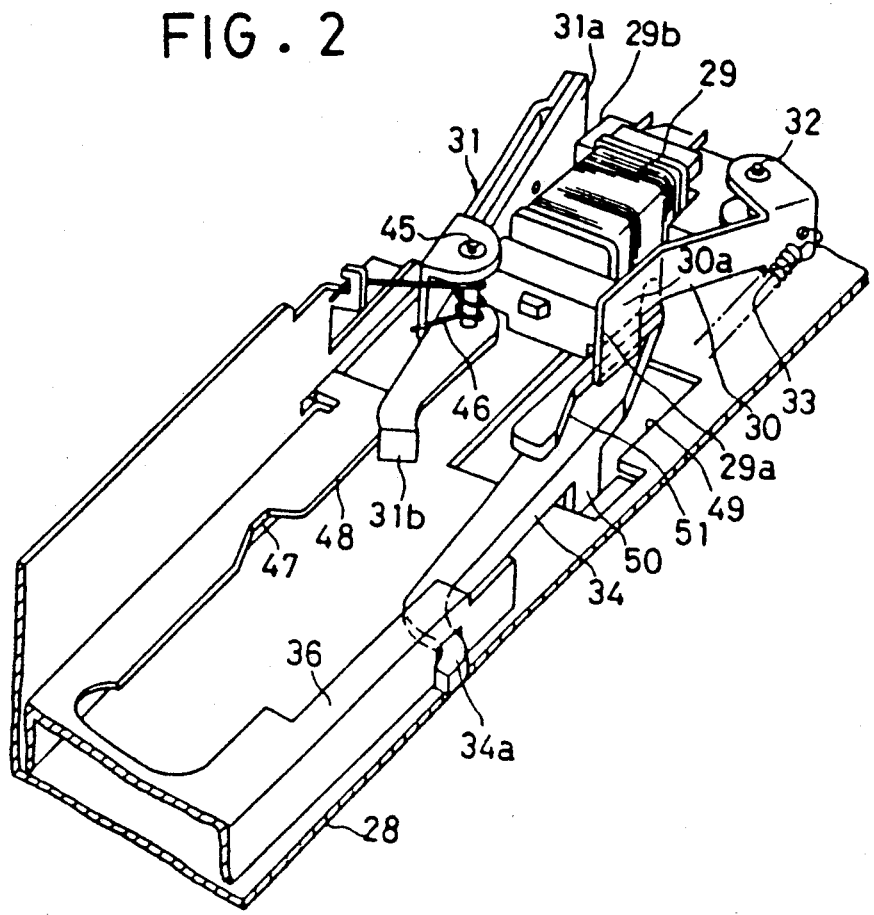
FIG. 2 is a perspective view of the main portion of the controller for the movable part as shown in FIG. 1, FIG. 3 to FIG. 5 are views for explaining the controller for the movable part, when operating.
Figure 4:
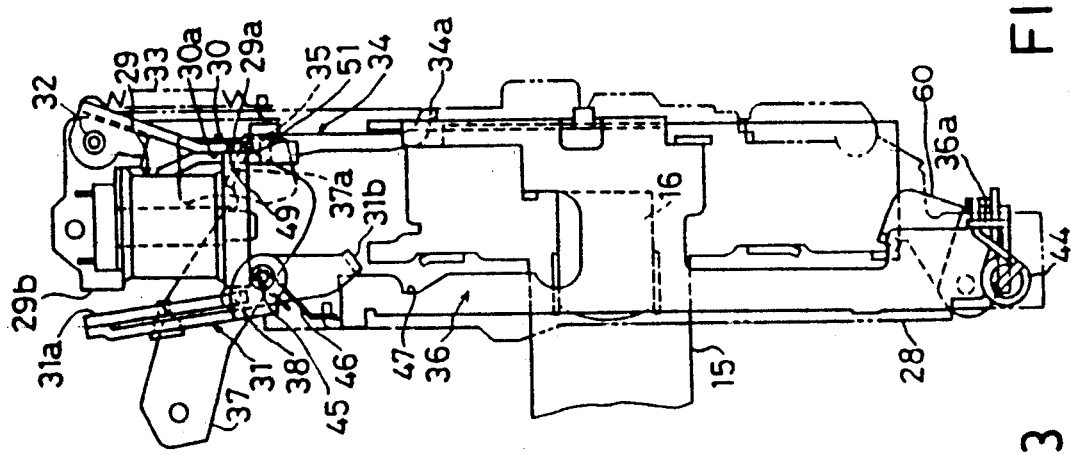

Mounted on the upper face of the plate, are motor (the driving source) 2, a pair of reel accepters 3a and 3b, and capstan shafts 4a and 4b. The rotation torque of the motor 2 is transmitted to each reel accepter 3a and 3b through a gear type rotation transmitting mechanism 5 and also to each capstan shaft 4a and 4b through a belt type rotation transmitting mechanism (not shown).The gear type rotation transmitting mechanism 5 includes a first gear 6 which is fixed with the rotating shaft of a motor 2, the second gear 7 which is geared into the first gear 6, a third gear 8 which rotates integrally with the second gear 7 on the same shaft, fourth gear 9 which is geared into a third gear 8, a fifth gear 10 which is geared into the fourth gear 9, a sixth gear 11 which rotates integrally with the fifth gear 10 ton the same shaft, a seventh gear 12 which is gared into the fifth gear 10, an eighth gear 13 which rotates integrally with the seventh gear 12 on the same shaft, and reel gears 14a and 14b for low speed rotation which rotate internally with each reel accepter 3a and 3b on the same shaft. In the play mode, the eighth gear 13 may be used to drive the reel gear 14a for low speed rotation of the reel accepter 3a at one side (the downward side in the Figure) through the changing gear 19. Alternatively the sixth gear 11 may drive the reel gear 14b for low speed rotation of the reel accepter 3b at the other side (the upper side of FIG. 1) through the changing gear 19. Each reel accepter 3a and 3b is rotated at a low speed (normal speed). On the upper face of the base plate 1, the head attaching plate 15 is installed movably in the directions of the arrows A and B (the direction of right and left in FIG. 1). The magnetic head 16 is attached on the upper face of the head attaching plate 15. This magnetic head 16 can play the tape of the tape cassette (not shown) after moving the head attaching plate 15 in the direction of the arrow A when in the play mode. The head attaching plate 15 is biased in the direction in which the magnetic head 16 is separated from the tap by the head returning spring 17, that is, in the direction of the arrow B. At the lower face of the apex side (the left end in FIG. 1) of the head attaching plate 15, the changing gear 19 for low speed rotation can be rotated through the supporting part 18, and be moved the direction making a right angle with the movable direction of the head attaching plate 15 (the directions of the arrows Ca nd D in FIG. 1). The supporting part 18 is made of plastic, is projectingly installed with the cylinder part 18b of the short shaft in a body on the middle upper face of the plate-like main body 18a. Slender foot pieces 18c and 18d are projectingly installed in a body on both sides of the outer circular face of the cylinder part 18b (the left side in FIG. 1). The draw-suspending piece 18e is projectingly installed in a body on one side of the outer circular face of the cylinder part 18b (the left side in FIG. 1). The cylinder part 18b extends into the first long hole 20a of the head attaching plate 15, and also the apexes of the foot pieces 18c and 18d extend into the second and third long holes 20b and 20c of the head attaching plate 15. The head attaching plate 15 is partially supported by the main body 18a and the draw-suspending piece 18e. The draw-suspending piece 18e is faced in the guide hole 22 of the moving plate 21 by positioning on the upper side of the head attaching plate 15 together with the foot pieces 18c and 18d.The moving plate 21 is installed movably in the direction of a right handle (the directions of other arrows C and D) to the moving direction of the head attaching plate 15 on the upper face of the base plate 1. In the combining hole 23 which is installed on the moving plate 21, the projectingly installed combining pin 25 is combined eccentrically on the upper face of the partially tooth-less gear 24. The partially tooth-less gear 24 has two tooth-less parts 24a and 24b displaced 180 degrees apart on the circumference, and the gear is movably supported on the shaft on the lower face of the base plate 1. The tooth-less gear 24 is geared into the first cam gear 26, and the first cam gear 26 is geared into the small diameter gear 27 which moves on the same shaft as the fourth gear 9 of the gear type rotation transmitting mechanism 5. Due to the rotation of about 180 degrees in the clockwise direction from the initial state (the state of FIG. 1) of the tooth-less gear 24, the moving plate 21 moves in the direction of arrow D. When it rotates again about 180 degrees in the clockwise direction of the tooth-less gear 24, the movable plate 21 moves in the direction of arrow C. The head attaching plate 15 reaches the play position by moving in the direction of arrow A when the moving plate 21 is in initial state (the state of FIG. 1), the apex of the foot piece 18c of the supporting part 18 slides from the declining edge part 22b of the guide hole 22 of the moving plate 21 through the guide edge part 22a. By this sliding contact, the changing gear 19 for low speed rotation moves in the direction of arrow C, with this supporting part 18 and this gear 19 contacts the sixth gear 11 of the gear type rotation transmitting mechanism 5 and reel gear 14b for low speed rotation at the reel accepter 3b of the other side. And when the moving plate 21 is in the position which has moved in the direction of arrow D, the head attaching plate 15 moves toward the play position, and in accordance with this moving, the apex of the foot piece 18d of the supporting part 18 slides through the guide edge from the declining edge part 22d of the guide hole 22 of the moving plate 21 through the guide edge part 22c . By this contact, the changing gear 19 for low speed rotation moves in the direction of arrow D with this supporting part 18, and this gear 19 contacts the eighth gear 13 of the gear type rotation transmitting mechanism 5 and the reel gear 14a for low speed rotation of the reel accepter 3a at one side. On the upper face of the base plate 1 corresponding to each capstan shaft 4a and 4b, a pinch roller which is not shown is installed movably. If the moving plate 21 moves toward one direction (the direction of arrow C) when the head attaching plate 15 is in the play position after moving the direction of arrow A, the pinch roller at one side is released form the capstan shaft 4a at one side, and the pinch roller at the other side attaches pressedly on the capstan shaft 4b at the other side. Also, if the moving plate 21 moves toward the other direction (the direction of arrow D) when the head attaching plate 15 is in the play position, the pinch roller of one side attracts pressedly the capstan shaft 4a of one side, and the inch roller of the other side is released for the capstan shaft 4b of the other side. The electromagnet 29 is installed on the upper face of the base frame 28 which is disposed at one edge part (the right side edge part in the FIGURE) of the base plate 1. The electromagnet 29 assumes the ON state when the tape cassette is charged in the given state, and it includes the attracting parts 29a and 29b on opposite sides. The first attracting part 29a (on the right side in the FIGURE) attracts the attracted part 30a of the first armature (the first attracted part) 30. The second attracted part 29b (on the left side in the FIGURE) attracts attracted part 31a of the second armature (the second attracted part) 31. The first armature 30 forms a plane state, and around its middle part is attracted part 30a. The base edge part is supported movably by the base frame 28 through the attaching shaft 32. The first armature 30 is biased toward the electromagnet (the clockwise direction in FIG. 1) by the returning spring 33. The apex part of the first armature 30 contracts the apex part of the rotatable lever (the combining part for moving) 34 made of plastics as shown in FIG. 2. This rotatable lever 34 has a combining concave part 35 in the middle part of the longitudinal direction. The base end part 34a is movable on the one end part of the slide lever (the movable member) 36 as shown in FIG. 2, and is slidable between this first end to a second position in the direction of making a right angle (the direction of arrows C and D) to the moving direction of the head attaching plate 15. The slide lever 36 is installed slidably toward the direction of arrows C and D on the upper face of the base frame 28. In accordance with the face that the first armature 30 is attracted on the first attracting part 29a of the electromagnet 29, the combining piece 37a on one end of the pull harm 37 (the firing part) is combined with the combining concave part 35 of the rotatable lever 34. The pull arm 37 is supported movably around the middle on the lower face of the base frame 28 by the attaching shaft 38 of the pinch roller arm. The end of the pull arm 37 is connected movably to one end of the swinging lever 39 as shown in FIG. 1. The swinging lever 39 is supported movably around the middle on the upper face of the base plate 1 by the attaching shaft 40. The another end of the swinging lever 39 is combined slidably with the cam 43 of the second cam gear 42 through the cam roller 41 which is installed movably on the end of the swinging lever 39. The second cam gear 42 possesses a tooth-less gear part 42a at one place. The second cam gear 42 is geared into the small diameter gear 27. When the second cam gear 42 rotates in the counterclockwise direction, the swinging lever 39 rotates toward the clockwise direction by the act of its cam 43. By this act, the pull arm 37 rotates toward the clockwise direction, and the slide lever 36 can slide by being pulled in the direction of the second position (the direction of arrow C) through the rotatable lever 34 in which the combining piece 37a at one end of this pull arm 37 in combined with the combining concave part 35. In accordance with the slide of the his slide lever 36, the head attaching plate 15 is push toward one direction (the direction of arrow A) by the head pushing spring 44. One end of this head pushing spring 44 is suspended at the spring suspending part 36a of the other end of the slide lever 36, and the other end of the spring thereof is suspended at the spring suspending part of the pushing body 60 which pushes the head attaching plate 15. The second armature 31 includes the attracted part 31a on one end, and also it possesses the combining part 31b on the other end. It is supported movably around the middle part on the upper face of the base from a 28 by the attaching shaft 45. The second armature 31 is biased toward the electromagnet (the clockwise direction i FIG. 1) by the returning spring 46. And when the slide lever 36 has reached the second position by sliding toward the direction of arrow C, the combining part 32b of the second armature 31 is combined with the combining groove 47 (the combining part for keeping position)( which is installed on the one edge part of the slide lever 36. When combined, the slide lever 36 is maintained in this state (the state of FIG. 4) toward the second position if the second armature 31 is attracted toward the second attracting part 29b of the electromagnet 29. The slide lever 36 is biased toward the direction of the first position by the head pushing spring 44. Therefore, when the electromagnet 29 has assumed the OFF state, the slide lever 36 assumes the state of FIG. 1 after returning to the first position by the biased force of the head pushing spring 45.

The portion of one end (the upper end in the FIGURE) from the combining groove of the one edge part of the slide lever 36 is assigned as the released position keeping part 48. And when the slide lever 36 is situated between the first position and just before the second position, the combining part 31b of the second armature is contacts the released position keeping part 48, and by this act, the attracting part 31a of the second armature 31 is maintained in the released position, away for the second attracting part 29b of the electromagnet 29. The stopper wall 49 acts as a release preventing part on one side (the right side edge part in the FIGURE) of the base frame 28. And when the slide lever 36 is at a position from the halfway between first and second positions to its second position, the combining wall 50 which is installed on the lower side face of the rotatable lever 34 contacts the stopper wall 49, and by this act, the combining concave part 35 of its rotatable lever 34 is prevented form releasing the combining piece 37a of the pull arm 37. The declining wall 51 acts as a separating part is and projects from the upper face of the rotatable lever 34. This, declining wall 51 separates the first armature 30 forcibly from the first attracting part 29a of the electromagnet 29 after the slide lever 36 has moved from the first position toward the second position and, the rotatable lever 34 has reached the stopper wall 49, and also before the slide lever 36 has reached the second position.

Figure 6:
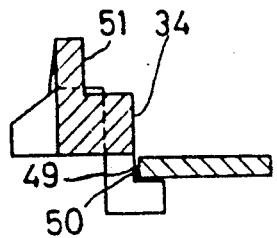
FIG. 6 is a sensational view taken along the line VI—VI of FIG. 4.
Figure 5:
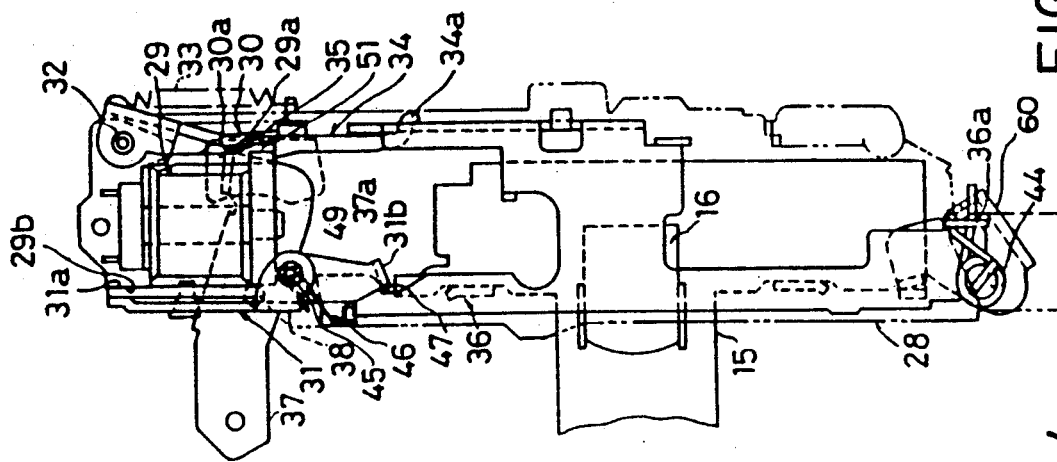

FIG. 1 shows the stopped state. When a tape cassette is charged to the movement position during this state, the motor 2 rotates by switching to the ON state in connection with the charging movement. In accordance with the rotation of motor 2, both capstan shafts 4a and 4b are rotated in the arrow direction through the belt type transmitting mechanism. And when the play operation switch is switched to the ON state after finishing the charging action of a tape cassette, the electromagnet 29 is switched to the ON state, and the attracted part 30a of the first armatured 30 i attracted to the first attracting part 29a, and by this act, the first armature 30 rotates in the clockwise direction, and the rotating lever 34 rotates in the clockwise direction of by using the base end part 34a as a fulcrum. In accordance with the rotation of this rotating lever 34, the combining piece 37a of the pull arm 37 combines with the combining concave part 35. On the other hand, since the combining part 31b of he second armature 31 contacts the released position keeping part 48, the rotation toward the clockwise direction hindered, and owing to this hindrance, the second armature 31 is not attracted to the attracting part 29b of the electromagnet 29. By this act, the magnetic flux is concentrated on the first attracting part 29a, and the attracted part 30a of the first armature 30 is strongly attracted on its first attracting pat 29a. On the other hand, since the second cam gear 42 is geared into the small diameter gear 27 already at the stopped state (the state of FIG. 1), the rotation torque of the motor 2 is transmitted to the second cam gear 42 through the first gear 6, the second gear 7, the third gear 8, the fourth gear 9 and the small diameter gear 27 in the gear type rotation transmitting mechanism 5 so that the second cam gear 42 is rotated in the clockwise direction. In accordance with the rotation of the second cam gear 42, the swinging lever 39 which contacts slidably with its cam 43 through the cam roller 41 rotates in the clockwise direction from the state in the FIG. 1 and FIG. 3. In accordance wit the rotation of this swinging lever 39, the pull arm 37 rotates in the counterclockwise direction from the state in the FIG. 1 and FIG. 3. Since the combining piece 37a of this pull arm 37 is combined with the combining concave part 35 of the rotatable lever 34, the slide lever 36 moves toward the direction of arrow C (the direction of the second position) from the situated state on the first position as shown in the FIG. 1 and FIG. 3 in accordance with the rotation of the pull arm 37 toward the counterclockwise. When the slide lever 36 reaches a position from halfway between the first and the second positions to its second position, the combining wall 50 of the rotatable lever 34 as shown in FIG. 6 combines with the stopper wall 49 of the base frame 28, and by this act, the release of the combining concave part 35 of this rotatable lever 34 from the combining piece 37a of the pull arm 37 (the state of FIG. 4) is prevented. After the state of the FIG. 4 has been reached, that is, the state that the combining wall 50 of the rotatable lever 34 has combined with the stopper wall 49, if the slide lever 36 moves further toward the direction of the second position, the declining wall 51 of the support face of the rotatable lever 34 wedges itself between the first armature 30 and the first attracting part 29a of the electromagnet 29, and by this act, the first armature 30 is released forcibly from the first attracting part 29a. By this act, the magnetic flux is concentrated on the second attracting part 29b of the electromagnet 29. In this manner, the combining part 31b of the second armature 31 combines wit the combining groove 47 of the slide lever 36, as soon as the slide lever 36 reaches the second position, and by this act, the second armature 31 rotates in the clockwise direction, and the attracted part 31a is attracted to the second attracting part 29b of the electromagnet 29, and the slide lever 36 is maintained in the second position (the state of FIG. 5). As mentioned above in this case, since the magnetic flux is concentrated on the second attracting part 29b of the electromagnet 29, the second armature 31 is attracted strongly to this second attracting part 29b.

Thus, in accordance with the fact that the slide lever 36 moves toward the second position from the first position, the head pushing spring 44 rotates in the counterclockwise direction, and by this rotation, the head attaching plate 15 assumes the play position after moving in the direction of arrow A against the biasing force of the head returning spring 17, and the magnetic head 16 contacts the tape of the tape cassette. If the moving plate 21 has moved to the position in the direction of arrow C when moving to the play position of the head attaching plate 15 as shown in FIG. 1, the supporting part 18 moves in the direction of arrow C together with the changing gear 19 for low speed rotation after being guided by the guide edge parts 22a and 22b of the guide hole 22 of the moving plate 21. By this act, the gear 19 for low speed rotation gears into both the sixth gear of the gear type rotation transmitting mechanism 5 and the reel gear 14b for low speed rotation of the reel accepter 3b of the other side. By this act, the rotation torque of the motor 2 is transmitted to the reel accepter 3b of the other side through the first gear 6, the second gear 7, the third gear 8, the fourth gear 9, the fifth gear 10, the sixth gear 11, the changing gear 19 for low speed rotation and the reel gear 14b for low speed rotation of the other side, and this reel accepter 3b of the other side is rotated at low speed (the normal speed) in the counterclockwise direction. When the moving plate 21 has moved to the position in the direction of arrow C, the pinch roller of the other side contacts with the capstan shaft 4b through the tape and rotates in the direction clockwise, and together with this rotation, the pinch roller of one side does not contact the capstan shaft 4a. Thus while the tape is rolled up from the reel accepter 3a of one side to the reel accepter 3b of the other side, the play movement is performed.

If the moving plate 21 has moved to the position in the direction of arrow D when moving toward the play position of the head attaching plate 15, the supporting part 18 moves in the direction of arrow D together with exchanging gear 19 for low speed rotation by guiding of the guide edge parts 22c and 22d of the guide hole 22 of the moving plate 21. By this act, the changing gear 19 for low speed rotation gears into both the eight gear 13 of the gear type rotation transmitting mechanism 5 and the reel gear 14a for low speed rotation of the reel accepter 3a of one side. Thus, the rotation torque of the motor 2 is transmitted to the reel accepter 3a of one side through the first gear 6, the second gear 7 the third gear 8, the fourth gear 9, the fifth gear 10, the seventh gear 12, the eight gear 13 and the changing gear 19 for low speed rotation i the gear type rotation transmitting mechanism 5 and the reel gear 14a for low speed rotation, and this reel accepter 3a of one side is rotated at low speed in the of clockwise direction.

When the moving plate 21 has moved to the position in the direction of arrow D, the pinch roller of one side contacts the capstan shaft 4a through the tape, and together with this rotation in counterclockwise direction, the pinch roller of the other side does not contact the capstan shaft 4b of the other side. By this act, while the tape is roller up toward the reel accepter 3a of one side from the reel accepter 3a of the other side, the play movement is performed.

Figure 3:
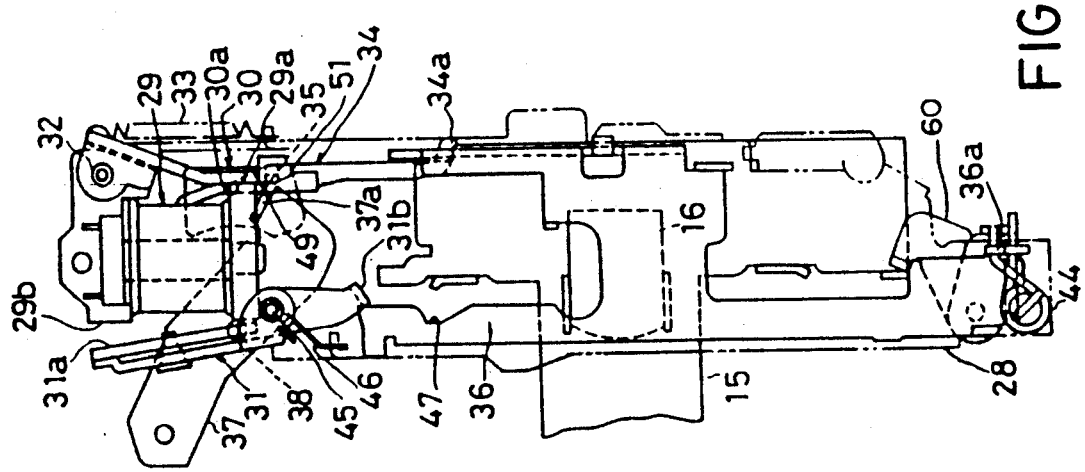

During this play movement, fi the operation stopping switch is on, the electric current flowing to the electromagnet 29 is interrupted and demagnetized. By this act, he slide lever 36 returns to the first position by the biasing force of the head pushing spring 44. Since this slide lever 36 slides toward the direction of the first position, the combining wall 590 of the rotatable lever 34 is detached from the stopper wall 49. By this act, the first armature 30 rotates in the clockwise direction in the Figures by the biasing force of the spring, and the attracted part 30a is kept up maintained in the attracted state to the first attracting part 29a of the electromagnet 29. Also, fact that the slide lever 36 slides toward the direction of the first position, the combining part 31b of the second armature 31 contacts the released position keeping part 48 by detaching from the combining groove 47 of the slide lever 36, and by this act, the second armature 31 is rotated in the clockwise direction as shown in the Figures against the biasing force of the returning spring 46, and the attracted part 31a is kept up in the state of release for the second attracting part 29b of the electromagnet 29, and becomes the stopped state again as shown in FIG. 1 and FIG. 3.

Further more, in the abovementioned embodiment of the invention, although the release part 51 is installed on the combining part 34 for moving, the release part 51 may be installed on the movable member 36 without limiting the above installation.

Therefore, the movable member is moved for the first position to the second position by an electromagnet with a small capacity, and the maintenance of the second position can be performed securely, And also, as one electromagnet is enough, the electric current changing circuit which has been needed so far is not necessary, and the constitution becomes simple together with the face that only one electromagnet is needed. It thus requires less space and is light weight.

And also, in case that the movable member is situated between the first position and just before the second position, the released position keeping part which keeps upon the second attracted part on the position released from the second attracting part is installed, and by this act, since the magnetic flux can be concentrated on the first attracting part which is needed at the moving of movable member from the first position to the second position, the first attracted part can be strongly attracted on the first attracting part.

What is claimed is:

1. A controller for a movable member which is able to move freely between a first and a second position, comprising,
an electromagnet having first and second attracting parts;
first and second attracted parts corresponding to said first and second attracting parts;
a driving member which is driven through a fixed motion by a driving source;
a combining part for moving which is located on said movable member and is separable from said driving member and maintained in a combined state with said driving member by said first attracted part;
a combining part for keeping position which is located on said movable member and the combining part for keeping position to maintain said movable member in said second position by combining with said second attracted part;
a leaving prevention part for preventing the leaving from said driving member of said combining part for moving when said movable member is at a position from halfway between said first and second positions to said second position; and
a separating party which is installed on said moving member or on said combining part for moving, for pulling apart said first attracted part forcibly from said fist attracting part after said combining part for moving has reached said leaving prevention part by movement of said movable member from said first position toward said second position and also before said part reaches said second position; wherein a separated position holding part is mounted on said movable member so as to maintain said second attracted part in the position separated form said second attracting part where said movable member is positioned between said first position and just before said second position.

* * * * *